United States Patent Office 3,210,152
Patented Oct. 5, 1965

3,210,152
REGENERATION OF METAL-CONTAINING REACTION COMPONENTS AND PROCESS FOR THE PRODUCTION OF PALLADIUM CHLORIDE
Robert van Helden and Taeke Jonkhoff, Amsterdam, Netherlands, assignors to Shell Oil Company, New York, N.Y., a corporation of Delaware
No Drawing. Filed May 25, 1962, Ser. No. 197,608
6 Claims. (Cl. 23—87)

This application is a continuation-in-part application of co-pending Ser. No. 179,796, filed March 14, 1962, now abandoned.

This invention relates to the regeneration of metal-containing components comprised in reaction mixtures employed in the execution of organic reactions. The invention relates more particularly to the regeneration of reaction mixture components comprising a metal of the palladium or platinum groups, which metal has been converted from a higher to a lower valent state during the course of execution of an organic reaction.

Compounds of metals of the palladium and platinum groups find application in the execution of organic reactions of varying types. During the course of use, at least a part of the metal component is converted from a higher to a lower valent state. Since these metals are relatively costly, the practicability of such processes is often dependent upon ability to regenerate the reaction mixture component comprising the metal in its initial higher valent state. The regeneration procedure must be carried out efficiently with a minimum of operative steps. It must furthermore lend itself to continuous operation and preferably in a manner capable of efficient integration with the execution of a desired organic reaction.

It is therefore an object of the present invention to provide an improved process enabling the more efficient regeneration of reaction mixture components comprising a metal of the palladium and/or platinum groups, the metal component of which has been converted from a higher to a lower valent state during use.

In accordance with the present invention, at least partially spent reaction mixture components comprising a metal of the palladium and/or platinum groups in which the metal has been converted from a higher to a lower valent state during the course of execution of an organic reaction therewith, are subjected to a regeneration procedure comprising the steps of contacting said at least partially spent reaction mixture components, in the absence of any substantial amount of water, with an oxygen-containing gas in the presence of (1) a monocarboxylic acid, (2) an acid selected from the group consisting of the mineral acids and sulfonic acid, and (3) a promoter, thereby regenerating the reaction mixture components comprising said metal in its initial higher valent state.

The at least partially spent metal-containing reaction mixture components to the regeneration of which the present invention is directed are those formed during the execution of an organic reaction in the presence of a component comprising a metal of the palladium and/or platinum group in a high valent state. The metal-containing component may function, for example, as a reactant, a catalyst, a by-product acceptor, or the like, in the process resulting in its conversion to an at least partially spent component comprising the metal in a lower valent state. The metal-containing reaction components in their initial state comprise compounds of the metals of the palladium and/or platinum groups wherein the metal is in a high valent state. These include compounds of ruthenium, rhodium, palladium, osmium, iridium and platinum, such as, for example, their halides, carboxylates, organic complexes, etc. The more frequently employed comprise the compounds of palladium, rhodium and platinum. Specific examples include their halides as palladium dichloride, platinum tetrachloride, complexes of such halids with organic constituents, etc. These materials are also employed in the additional presence of salts of these metals in their higher valent state with tertiary alkanoic acids (trialkyl acetic acids) such as their pivalates and the higher homologues thereof. Processes carried out in the presence of such palladium and/or platinum group metal-containing components comprise, for example, the production of alkenyl esters of carboxylic acids by reacting an olefin with a carboxylic acid salt of an alkali metal or of an alkaline earth metal and/or of a metal of the palladium or platinum groups. Specific examples of such reactions are the production of vinyl carboxylates by reacting ethylene with such carboxylate salts in the presence of a halide of a metal of the palladium or platinum groups. Thus vinyl acetate is produced by reacting ethylene with sodium acetate and/or palladium acetate in the presence of palladium dichloride.

$$C_2H_4 + PdCl_2 + 2NaOCOCH_3 \rightarrow C_2H_3OCOCH_3$$
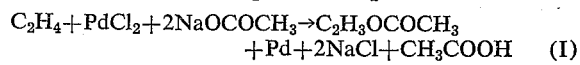
$$+ Pd + 2NaCl + CH_3COOH \quad (I)$$

Examples of other reactions comprise the oxidation of olefinic compounds to oxygen-containing reaction products comprising aldehydes, ketones, acids, etc., in the presence of palladium halides, as the oxidation in the presence of palladium dichloride of ethylene to acetaldehyde-containing products, etc. During the course of these processes at least a part of the palladium and/or platinum group metal-containing components of the reaction mixture are converted to at least partially spent components comprising these metals in a lower valent state and/or in the uncombined metal state.

The present invention now provides an efficient and practical method for converting the at least partially spent metal-containing components to valuable components comprising these metals in their higher valent state suitable for reuse in the process.

The at least partially spent metal-containing component of the reaction mixture may be separated therefrom by conventional means prior to being subjected to the regeneration procedure of the presently claimed invention. They may also be subjected to the regeneration procedure in the presence of other components of the reaction mixture in which they are produced. Material which is harmful to the regeneration procedure such as, for example, substantial amounts of water, when present, is preferably removed from the metal-containing material to be regenerated. The invention lends itself readily to integration with the execution of the organic reaction in which the metal is reduced to lower valent state. Thus a portion of the reaction mixture may be withdrawn continuously from the reaction zone, the mixture subjected to the regeneration procedure resulting in the conversion of the metal component to its original higher valent state, followed by the return of the regenerated mixture to the reaction zone. Such an integrated procedure is carried out advantageously where the reaction mixture comprises components essential to the execution of the regeneration procedure. When components essential to the attainment of the regeneration conditions are already present in the reaction mixture, or can be added thereto without adverse effect upon the execution of the desired organic reaction, the regeneration may be carried out in situ.

In accordance with the invention, the component comprising the metal of the palladium and/or platinum groups which has been reduced to a lower valent state, or to the uncombined metal, is contacted, under substantially anhydrous conditions, with an oxygen-containing gas in the presence of a liquid mixture comprising both a carboxylic acid and a mineral acid, as well as a promotor. The oxygen-containing gas may be obtained from any suitable outside source and may consist, for example, of essentially pure oxygen or a diluted oxygen-containing gas such as air.

Suitable carboxylic acid components of the acid mixture, in the presence of which the regeneration procedure is carried out, comprise broadly the essentially saturated carboxylic acids and especially the alkyl monocarboxylic acids. Such suitable monocarboxylic acids include, for example, lower alkyl monocarboxylic acids such as, for example, acetic acid, propionic acid, butanoic acid, as well as their higher homologues, and mixtures of two or more thereof. Particularly suitable monocarboxylic acids comprise the tertiary alkanoic acids represented by the general formula:

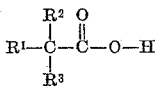

(II)

wherein $R^1$, $R^2$ and $R^3$ are alkyl, such as for example, methyl, ethyl, propyl, butyl, etc. These trialkanoic acids may be referred to as trialkylacetic acids. These acids, and mixtures containing them as predominant components, are obtained by the acid-catalyzed carboxylation with carbon monoxide and water of olefinic hydrocarbons. The trialkylacetic acids-producing reaction is executed in liquid phase at a temperature in the range of from about −25 to about 100° C. and at relatively low pressures, for example, in the range of from about 20 to about 150 atmospheres. Suitable methods for preparing carboxylic acids, containing the trialkanoic acids as a predominant component, are disclosed in U.S. Patent 2,976,241 and in copending applications Serial Nos. 858,609; 858,796; and 858,797, filed December 10, 1959. Suitable olefinic charge materials thus reacted with carbon monoxide and water to produce tertiary monocarboxylic acids comprise commercially available unsaturated hydrocarbons predominating in monoolefins such as, for example, branched or unbranched pentenes, hexenes, heptenes, octenes, nonenes, decenes and high alkenes; polymers and co-polymers of such alkenes, such as diisobutylene, propylene-dimer, -trimer and -tetramer; isobutylene trimer; cyclic alkenes, such as cyclopentene and cyclohexene; etc. Commercially available mixtures comprising these alkenes are also used, for example, olefin-containing hydrocarbon fractions such as obtained by thermal vapor-phase cracking of paraffin wax in the presence of steam. Olefin-rich products obtained in the Fischer-Tropsch synthesis carried out under moderate pressure also constitute examples of a suitable source of the alpha-branched monocarboxylic acids. Monoolefins preferably employed in the production of the suitable carboxylic acids generally comprise those having from about six to about twenty carbon atoms to the molecule.

Another method of producing the suitable tertiary monocarboxylic acids (trialkylacetic acids) comprises that relying upon the reaction of saturated hydrocarbons with carbon monoxide and water in the presence of a hydrogen acceptor as described and claimed in copending application Serial No. 141,287, filed September 28, 1961. Still other methods enabling the production of the suitable alkanoic acids consisting predominantly of trialkylacetic acids comprise those disclosed and claimed in U.S. Patents 2,913,489 and 2,913,491 and in copending U.S. application Serial No. 761,376, filed September 16, 1958, which matured into U.S. Patent 3,047,622. Still another method comprises the reaction of olefins with metal carbonyls, for example, nickel carbonyl, known as the "Reppe" method. It is to be understood that the invention is not limited with respect to the source of the tertiary alkanoic acids used as component of the liquid medium in which the regeneration is carried out. A particularly suitable carboxylic acid component, because of its stability under oxidizing conditions, comprises an admixture of the trialkyl acetic acids having from about 8 to about 21, and preferably from about 9 to about 11 carbon atoms, obtained by the acid-catalyzed carboxylation with carbon monoxide and water of a $C_{8-10}$ olefinic hydrocarbon fraction separated from the products of thermal cracking of paraffinic hydrocarbons. Suitable essentially trialkanoic acid mixtures comprise those commercially available under the trade name "Versatic 911."

Essential to the attainment of the suitable regenerating conditions is the presence in addition to the carboxylic acid, of an acid selected from the group consisting of the mineral acids and sulfonic acid. The particular acids employed will be governed to some extent by the nature of the metal-containing component to be regenerated. Thus when the metal component is to be regenerated in the halide form a halogen acid is used; when regenerating the chloride, the mineral acid employed is hydrochloric acid.

Essential to the attainment of the objects of the invention is the presence in the acid mixture of a promotor for the regeneration reaction. Comprised within the suitable materials capable of functioning as such promotors are the multivalent redox agents. These include, for example, compounds such as oxides; halides, particularly chlorides; carboxylates, for instance, the acetates, propionates, pivalates, and the like; of the multivalent redox metals such as copper, iron, vanadium, gold, arsenic, antimony, cerium, thallium, mercury, tin, cobalt, manganese, lead, etc. In a preferred method of operation the specific metal redox agent is added in a manner assuring the presence of the metal component in a higher and a lower valent form simultaneously; the higher valent form preferably being present in predominant amount. Other suitable redox agents comprise the oxides of nitrogen, e.g., nitrogen monoxide and nitrogen dioxide. Either one of these nitrogen oxides, or a mixture of both, may be introduced into the system. Two or more promoters may be employed simultaneously.

Particularly preferred promoters comprise the combination of nitrogen monoxide with one or more of the multivalent metal redox agents such as, for example, iron, copper, and the like, wherein the multivalent metal components are present as carboxylates, such as for example, the acetates, the propionates, the pivalates, or the like. A particularly suitable promotor comprises the combination of nitrogen monoxide with copper acetate. In a preferred embodiment of the invention, the regeneration is carried out in the presence of a mixture of promoters comprising nitrogen monoxide and basic iron acetate ($FeOH(C_2H_3O_2)_2$).

Rather small quantities of the oxidation promoters are usually required, i.e., not more than about 0.25 mole per mole of metal component to be regenerated. In most cases the amount of promoter present need not exceed about 15 mole percent of the metal component being regenerated. Generally an amount of promoter ranging, for example, from about 5 to about 10 mole percent of the metal component being regenerated need not be exceeded. Greater or lesser amounts of the promoters may, however, be used within the scope of the invention.

The regeneration may be carried out with the use of a superatmospheric oxygen-containing gas pressure. Generally a partial oxygen pressure in the range of from about 1 to about 100 atmospheres, and preferably in the range of from about 1.5 to about 50 atmospheres, is satisfactory. The regeneration is carried out at a temperature in the range of from about 0 to about 150° C. The use of temperatures in the range of from about 30 to about 100° C. is generally preferred. Somewhat higher or lower temperatures may, however, be employed within the scope of the invention.

The regeneration process of the invention is applied with particular advantage in the regeneration of the partially spent reaction mixture components obtained in the production of alkenyl esters of carboxylic acids from starting materials comprising olefinically unsaturated hydrocarbons, for example, as described and claimed in copending application Serial No. 179,796, filed March 14, 1962, now abandoned, of which the present application is a continuation-in-part. Suitable olefinic hydrocarbons employed in such reactions comprise for example propylene, 1-butylene, 2-butylene, styrene, mixed olefins obtained by the cracking of paraffinic hydrocarbons such as paraffin waxes, high-boiling paraffinic fractions and residues obtained in the distillation of mineral oils and distillate fractions of cracking products of high-boiling petroleum fractions, olefins prepared by polymerization or copolymerization of ethylene and/or propylene, diolefins such as butadiene and isoprene, etc. In such procedures the olefin is reacted with a suitable reactant such as, for example, an alkali metal salt or alkaline earth metal salt of a carboxylic acid such as, for example, sodium acetate, lithium acetate, potassium acetate, calcium acetate, and the like. The olefin and the carboxylic acid salt interact in the presence of a compound of a metal of the palladium and/or platinum groups with the formation of alkenyl esters wherein the alcohol moiety of the ester corresponds to the olefin charged and the acid portion of the ester corresponds to the carboxylate residue of the salt reactant. Thus vinyl acetate is formed by reacting ethylene with sodium acetate in the presence of palladium dichloride in an acetic acid medium. The alkenyl esters may also be formed by reaction of the olefin with the suitable carboxylic acid salt of a metal from the palladium and/or platinum group, optionally in the presence of the above-defined alkali and/or alkaline earth metal salts of carboxylic acids. These reactions are generally executed in the presence of a carboxylic acid, preferably a monocarboxylic acid. Monocarboxylic acids therein employed comprise lower alkane monocarboxylic acids and the tertiary alkanoic monocarboxylic acids (trialkyl acetic acids) such as pivalic acid and its homologues.

During the course of execution of the organic reactions above-defined, such as the production of the alkenyl esters of monocarboxylic acids, the components of the reaction mixture comprising the metal of the palladium and/or platinum group such as, for example, palladium dichloride, are converted to at least partially spent components containing the metal in a lower valent state or as the metal. These partially spent components comprising the metal in lower valent state are regenerated in situ by addition of a mineral acid and a suitable promoter to the reaction mixture and the passage of oxygen-containing gas therethrough as defined herein above. In one embodiment of the invention, a portion of the reaction mixture comprising the partially spent metal-containing component and the monocarboxylic acid is continuously passed from the reaction zone to a separate regeneration zone. A promoter selected from those defined above, for example, nitrogen monoxide, and mineral acid, for example hydrochloric acid, are introduced into the regeneration zone and oxygen gas is passed therethrough under the above-defined conditions of regeneration. Under these conditions the metal-containing reaction mixture component, for example, one comprising palladium in lower valent state, is regenerated to the reaction mixture component containing palladium in palladium dichloride form. Regenerated reaction components comprising the metal in the higher valent state are recycled continuously from the regeneration zone to the reaction zone.

The invention is applied with particular advantage to the regeneration of at least partially spent palladium and/or platinum metal-containing reaction mixture components produced in the execution of organic reactions. The scope of the invention is, however, not limited thereto and may be applied broadly to the production of compounds comprising metals of the palladium and/or platinum groups in their higher valent state from starting materials obtained from any source comprising these metals in a lower valent state or as uncombined metal. The invention thus provides an efficient method for the production of valuable catalysts, reactants, etc. comprising these metals in their higher valent state, from the metals or metal-containing residues whatever their source.

*Example I*

In suspension of 10.7 parts by weight of palladium in 500 parts by weight of glacial acetic acid, 9.9 parts by weight of hydrogen chloride and 0.48 part by weight of nitrogen monoxide were dissolved. In this mixture 1.84 parts by weight of oxygen were gradually introduced; the temperature of the mixture being maintained at 30° C. The introduced oxygen was readily absorbed. After 30 minutes no further oxygen was supplied and 4 parts by weight of hydrogen chloride were then added to the mixture, while stirring. 0.1 part by weight of palladium had not been converted and were filtered off; the filtrate being subsequently reduced in volume by heating. Hydrogen chloride escaped from the mixture, whereas solid material was precipitated. The precipitate which was washed with acetic acid and dried, consisted of 17.3 parts by weight of palladium chloride.

*Example II*

A solution containing 44.8 parts by weight of palladium salts of "Versatic" 911 (a commercial product consisting predominantly of a mixture of trialkylacetic acids having from 9 to 11 carbon atoms to the molecule obtained by the acid-catalyzed carboxylation of olefins of at least 8 and at most 10 carbon atoms with carbon monoxide and water) and an equimolar quantity, i.e., 19.4 parts by weight, of sodium salts of "Versatic" 911 in 460 parts by weight of "Versatic" 911, was allowed to react with ethylene in a glass-lined rotating stainless-steel autoclave at a temperature of 70° C. and an ethylene pressure of 60 atmospheres. After five hours the ethylene pressure was released. The reaction mixture was filtered in order to remove metallic palladium. 7.3 parts by weight of palladium could be filtered off, corresponding to a conversion of 70 mole percent of palladium salts of "Versatic" 911 to metallic palladium. The filtrate was fractionally distilled. The amount of vinyl esters of "Versatic" 911 in the distillates was quantitatively determined by bromine titration. The vinyl esters were obtained in a yield of 70 mole percent calculated on converted palladium salts.

7 parts by weight of the metallic palladium separated by filtration from the reaction mixture is suspended in 350 parts by weight of "Versatic" 911. Hydrogen chloride in the amount of about 8 parts by weight and 0.45 part by weight of nitrogen monoxide are introduced. Oxygen is passed through the mixture, while maintaining the temperature at about 35° C., for a period of about 45 minutes. Thereafter an additional 4 parts by weight of hydrogen chloride are slowly introduced with stirring. Residual hydrogen chloride is removed by evaporation, leaving a mixture consisting essentially of palladium dichloride in "Versatic" 911.

*Example III*

Ethylene was introduced, at room temperature, and a pressure of 60 atmospheres into a mixture containing 69.8 parts by weight of sodium salts of "Versatic" 911 (a commercial product consisting predominantly of a mixture of trialkylacetic acids having from 9 to 11 carbon atoms to the molecule obtained by the acid-catalyzed carboxylation of olefins of at least 8 and at most 10 carbon atoms with carbon monoxide and water), 463 parts by weight of "Versatic" 911 and 16.1 parts by weight of palladium dichloride in a glass-lined rotating stainless-steel autoclave. After sealing the autoclave the contents were brought to a temperature of 70° C., the ethylene pressure then being 77 atmospheres. After five hours the temperature was reduced to room temperature and pressure was released by venting. The reaction mixture was then diluted with 313 parts by weight of pentane and filtered in order to remove metallic palladium, sodium chloride and non-converted sodium salts of "Versatic" 911. 8.83 parts by weight of palladium is filtered off, corresponding to a conversion of 91 mole percent of palladium dichloride to metallic palladium. The pentane solution was fractionally distilled. The amount of vinyl esters of "Versatic" 911 in the distillates was quantitatively determined both by bromine titration and by infrared spectroscopy. The vinyl esters were obtained in a yield of 81 mole percent calculated on converted palladium dichloride.

8 parts by weight of the metallic palladium separated from the reaction mixture by filtration is suspended in 400 parts by weight of "Versatic" 911. To the mixture there is added 10 parts by weight of hydrogen chloride, 5 parts by weight of nitrogen monoxide and 0.35 part by weight of cuprous oxide. Oxygen is passed through the resulting mixture for about 30 minutes while maintaining a temperature of 35° C. Thereafter, an additional 4.5 parts by weight of hydrogen chloride is added while stirring. Residual hydrogen chloride is removed by evaporation, leaving a mixture consisting essentially of palladium dichloride in "Versatic" 911 suitable for recycling to the process.

*Example IV*

23.5 parts by weight of palladium dichloride are suspended in 250 parts by volume of absolute ethyl alcohol. Ethylene is passed through the resulting mixture for one hour at 25° C. to form a complex compound with palladium chloride. A solution of 22.5 parts by weight of sodium ethoxide in 150 parts by volume of absolute ethanol was then added with stirring during 1½ hour, while ethylene was passed through the reaction mixture. The temperature rose to 55° C. during the reaction. The precipitated palladium metal was filtered with suction, and the filtrate analyzed for products. The main product, diethyl acetal of acetaldehyde, amounted to 12.4 parts by weight (80% m. on palladium chloride); it was identified by gas-liquid chromatography and by the 2,4-dinitrophenyl hydrazone (M.P.=168° C.) and could be converted into ethyl vinyl ether by passing the vapors over palladium on asbestos at 270° C.

20 parts by weight of the palladium separated by filtration are suspended with stirring in 200 parts by volume of anhydrous acetic acid containing 10 parts by weight of nitrogen monoxide and 3 parts by weight of copper acetate. At ambient temperature first anhydrous hydrochloric acid was passed through for ½ hour, and then chlorine for ¾ hour. The palladium dissolved, and a dark-red solution was obtained. On heating this solution at 100° C., chlorine and hydrochloric acid escaped, and palladium chloride precipitated. It was filtered and dried; the yield was nearly quantitative.

We claim as our invention:

1. In the process for recovering as palladium dichloride the palladium content of a spent reaction mixture obtained by reacting an ethylenically unsaturated hydrocarbon with a liquid reaction mixture comprising at least one member of the group consisting of palladium dichloride and palladium salts of monocarboxylic alkanoic acids in admixture with a member of the group consisting of monocarboxylic alkanoic acids and the alkali metal and alkaline earth metal salts thereof, thereby producing reaction products comprising alkenyl esters of carboxylic acids with simultaneous conversion of said palladium salts to a lower valent state, the steps which consist essentially of separating said palladium in reduced valent state from said spent reaction mixture, contacting said separated palladium, under substantially anhydrous conditions, at a temperature of from about 0° to about 150° C., with oxygen in the presence of a monocarboxylic tertiary alkanoic acid, hydrogen chloride, and a promoter selected from the group consisting of nitrogen monoxide, nitrogen dioxide, and the polyvalent redox metals, and separating palladium dichloride from the resulting mixture.

2. The process in accordance with claim 1 wherein said monocarboxylic tertiary alkanoic acid is a trialkylacetic acid of 8 to 21 carbon atoms.

3. The process in accordance with claim 1 wherein said promoter consists essentially of an oxide of nitrogen and basic iron acetate.

4. The process for producing palladium chloride which comprises contacting metallic palladium, under substantially anhydrous conditions, with oxygen at a temperature of from about 0 to about 100° C., in the presence of a mixture consisting essentially of a monocarboxylic tertiary alkanoic acid, hydrogen chloride and a promoter selected from the group consisting of the mono- and dioxides of nitrogen and polyvalent redox metals.

5. The process for the production of palladium dichloride which comprises contacting palladium metal with oxygen under substantially anhydrous conditions, at a temperature of from about 0 to about 100° C., in the presence of a mixture consisting of hydrogen chloride, a trialkylacetic acid and a member of the group consisting of nitrogen monoxide and nitrogen dioxide.

6. The process in accordance with claim 5 wherein said trialkylacetic acid contains from 9 to 11 carbon atoms to the molecule.

References Cited by the Examiner

UNITED STATES PATENTS

| 2,006,221 | 6/35 | Ridler | 252—413 |
| 2,704,281 | 3/55 | Appell | 252—413 |
| 2,963,445 | 12/60 | Nixon | 252—416 |
| 3,016,354 | 1/62 | Hindin | 252—413 |

OTHER REFERENCES

Mellor: Comprehensive Treatise on Inorganic and Theoretical Chemistry, vol. 15, page 660 (1936), Longmans, Green & Co., N.Y.

Moiseev et al.: Proceedings of the Academy of Sciences, vol. 133, No. 1–6, pages 801–804 (July-August 1960).

MAURICE A. BRINDISI, *Primary Examiner.*

GEORGE D. MITCHELL, *Examiner.*